W. C. MARR.
Revolving Sulky Scraper.
No. 232,738.          Patented Sept. 28, 1880.
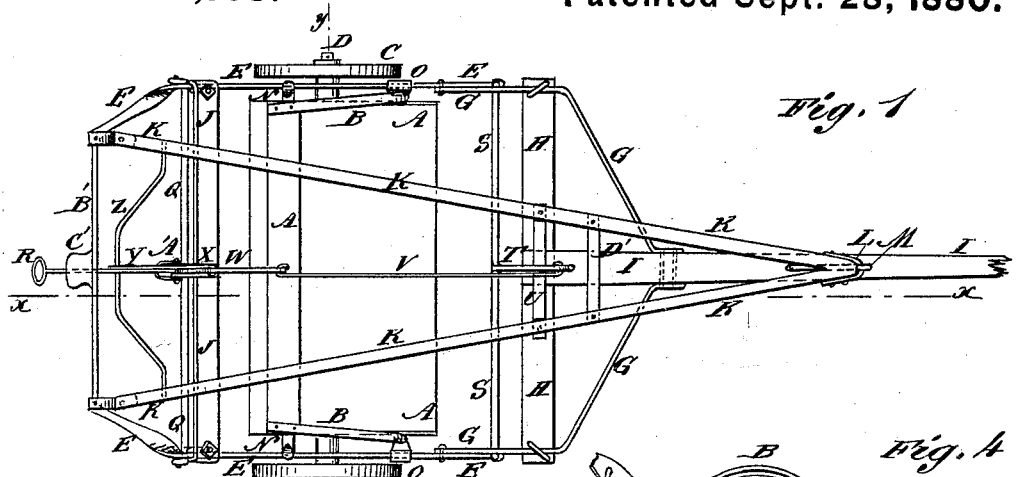
Fig. 1.
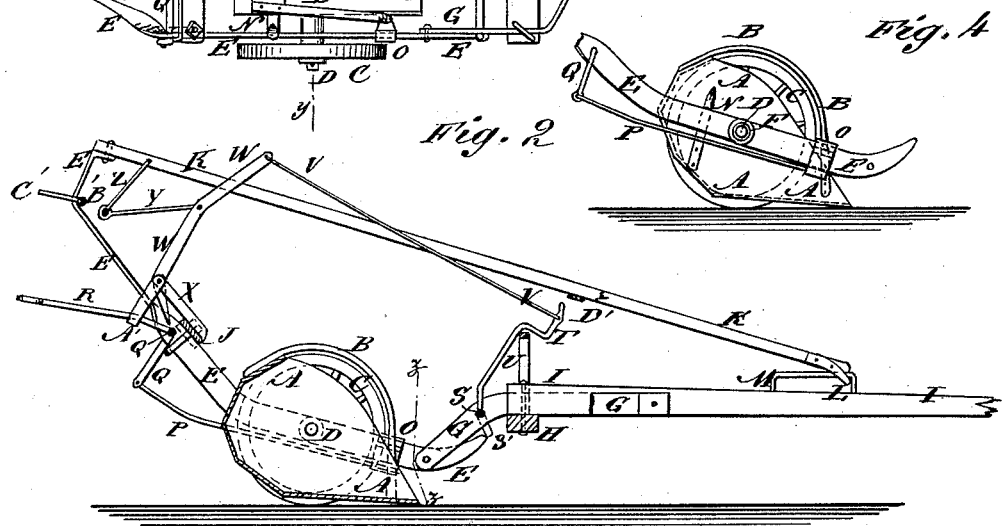
Fig. 4.
Fig. 2.
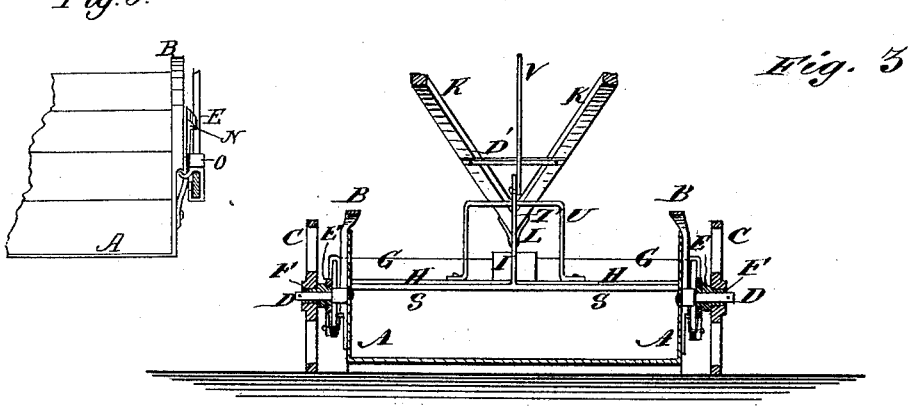
Fig. 5.
Fig. 3.
WITNESSES:
C. Neveux
C. Sedgwick
INVENTOR:
W. C. Marr
BY Munn & Co
ATTORNEYS.

UNITED STATES PATENT OFFICE.

WILLIAM C. MARR, OF ONAWA, IOWA, ASSIGNOR TO MITCHELL VINCENT AND MEHETTABEL T. MARR.

REVOLVING SULKY-SCRAPER.

SPECIFICATION forming part of Letters Patent No. 232,738, dated September 28, 1880.

Application filed July 22, 1879.

*To all whom it may concern:*

Be it known that I, WILLIAM C. MARR, of Onawa, in the county of Monona and State of Iowa, have invented a new and useful Improvement in Revolving Sulky-Scrapers, of which the following is a specification.

Figure 1 is a top view of my improved scraper. Fig. 2 is a vertical longitudinal section of the same, taken through the line $x\,x$, Fig. 1. Fig. 3 is a vertical cross-section of the same, taken through the line $y\,y$, Fig. 1. Fig. 4 is a detail side view of a part of the same. Fig. 5 is a cross-sectional view through line $z\,z$ of Fig. 2.

Similar letters of reference indicate corresponding parts.

The object of this invention is to furnish an improved revolving scraper mounted upon wheels, which shall be simple in construction, convenient in use, and reliable in operation, and which shall be so constructed that it may be operated and controlled by a person riding upon it or walking in its rear.

A represents the body of the scraper, the back and the rear part of the bottom of which is made in the form of a longitudinal section of a polygonal cylinder, as shown in Figs. 2 and 4.

To the upper part of the ends of the scraper A are attached two bars, B, which are curved in the arcs of circles having their centers in the axis of the said scraper, and which are made with a radius a little longer than the radius of the wheels C.

To the centers of the ends of the scraper A are attached axles D, which pass through holes in the side bars, E, and through sleeves F, rigidly attached to the said bars E. The wheels C revolve upon the sleeves F, and are kept in place upon them by linch-pins passed through holes in the projecting ends of the axles D at the outer ends of the sleeves F, as shown in Fig. 3. The forward ends of the bars E are bent upward, and are pivoted at their bends to the rear ends of the bars G. The bars G are bent upward and forward, are attached to the cross-bar H, attached to the tongue I, and their forward parts are bent inward and forward, and are attached to the opposite sides of the said tongue I. The rear parts of the bars E, a little in the rear of the scraper A, are connected by a cross-bar, J. The rear ends of the bars E are bent upward and are attached to the rear ends of two wooden bars, K, the forward ends of which meet at an angle and have an eye or loop, L, attached to them, to receive and slide upon a keeper, M, attached to the upper side of the tongue I.

To the rear parts of the ends of the scraper A are attached spring-catches N, which, when the said scraper revolves into working position, catch upon the upper edges of the bars E to prevent the said scraper from turning back. In the outer sides of the forward parts of the curved bars B are formed shoulders to rest upon the slides O, placed upon the forward parts of the pivoting-bars E, to hold the scraper from being turned forward while at work.

To the slides O are attached the forward ends of the rods P, the rear ends of which are pivoted to the downwardly-bent ends of the rod Q. The rod Q works in holes in the bars E, below the rear part of the cross-bar J, and to its middle part is rigidly attached a rearwardly-projecting arm or lever, R.

S is a rod, which passes through holes in the bars G, a little in the rear of the cross-bar H of the tongue I. The ends of the rod S, at the outer sides of the bars G, are bent downward, so as to rest against the ends of the bars E when the scraper A is in working position, to hold the said scraper down to its work.

To the center of the rod S is attached a catch, T, which catches upon the bend of the U-shaped bar U, to lock the rod S and the bars E in position when holding the scraper A in working position.

To the upper end of the catch T is pivoted the forward end of the rod V, the rear end of which is pivoted to the upper end of the lever W. The lever W is pivoted to an arm, X, rigidly attached to the center of the cross-bar J.

To the upper part of the lever W is pivoted the forward end of a short rod, Y, the rear end of which is pivoted to the bend of a swinging bent or U-shaped rod, Z.

The ends of the U-shaped rod Z are pivoted to the wooden bars K, so that the catch T may be withdrawn and applied by swinging the said U-shaped rod Z.

The lower end of the lever W is extended downward and bent forward close to the lever R, so that as the lever R is raised to operate the rods Q and P to draw back the slides O on the bars E, it at the same time lifts the lower bent end of the lever W, and causes said lever W, through its connecting-rod V, to withdraw the catch T from the bar U.

The lower end of the lever W is kept in place above the lever R by a loop, A', pivoted to the supporting-arm X of said lever W, and passing around said lever R. The loop A' also serves as a stop for the lever R, and prevents it from dropping too low and pushing the slides O so far forward that the shoulders of the bars B will not catch upon them.

To the upper parts of the bars E are attached the ends of a bar, B', to the center of which is attached a seat, C', for the driver.

To the lower side of the wooden bars K is attached a cross-bar, D', in such a position as to come over the U-shaped bar U and be caught and held by the catch T when the scraper A is raised from the ground.

In using the scraper it is loaded with the various parts in the positions shown in Fig. 2. When the scraper is loaded the lever W is drawn back by means of the swinging rod Z withdrawing the catch T from the U-shaped bar U and the ends of the rod S from the ends of the bars E. This throws the whole draft upon the pivots connecting the bars E and G, raises the forward edge of scraper A from the ground, and at the same time the upper end of the catch T strikes the cross-bar D' of the sliding bars K and rides thereon until the bent portion of said catch engages with said bar D' and the loop L of the bars K rest against the rear end of the keeper M, whereby all the parts are held securely in place for the transportation of the scraper to the place of unloading.

When the scraper A is to be unloaded the slides O are withdrawn from the shoulders of the bars B, allowing the forward edge of the scraper A to drop to and catch upon the ground, when the said scraper will turn over and discharge the load. As the scraper A completes its revolution it is caught by the slides O and the catches N and held with its forward edge raised, and may then be drawn back to the place of loading.

When the scraper is to be loaded the rear ends of the bars E are raised, which causes the bars K to slide forward upon the tongue I and moves the catch T forward to turn the ends of the rod S against the ends of the bars E and lock them there by catching upon the U-shaped bar U.

Having thus fully described my invention, I claim as new and desire to secure by Letters Patent—

1. The combination, with the curved bars B, arranged on sides of scraper A, and having shoulders on the outside of the front end, of the sliding sleeves O, that catch under said shoulders and lock the scrapers, as described.

2. The combination, with pivoted bars E G, the former having curved extension ends, of the rocking rod S, having bent ends to lock with said curved ends, for the purpose specified.

3. The combination of the scraper A, provided at its ends with the curved bars B, having shoulders formed upon the outer sides of their forward parts, the spring-catches N, and the axles D, the bars E, provided with the sleeves F, and the slides O, the wheels C, the cross-bar J, and the bars G, with the tongue I and its cross-bar H, substantially as herein shown and described.

4. The combination of the rods P, the rod Q, having its ends bent downward, and the lever R with the slides O and the bars E, substantially as herein shown and described.

5. The combination of the rod S, having its ends bent downward, the catch T, the U-shaped bar U, the rod V, the lever W, the rod Y, and the swinging U-shaped bar Z with the bars G E, the tongue I and its cross-bar H, and the cross-bar J, substantially as herein shown and described.

6. The combination of the bars G, inclined bars K, the loop L, and keeper M, and the cross-bar D', with the bars E, the tongue I, and the catch T, substantially as herein shown and described.

WM. C. MARR.

Witnesses:
   H. E. MORRISON,
   C. H. HOLBROOK.